United States Patent
Jones et al.

(10) Patent No.: US 10,241,993 B1
(45) Date of Patent: Mar. 26, 2019

(54) SYSTEM AND METHOD FOR DETECTING REUSABLE GROUPS OF DRAWING COMMANDS IN A SEQUENCE OF DRAWING COMMANDS

(71) Applicant: SOFHA GMBH, Berlin (DE)

(72) Inventors: Paul Jones, Veenendaal (NL); Christoph Oeters, Berlin (DE)

(73) Assignee: SOFHA GMBH, Berlin (DE)

( * ) Notice: Subject to any disclaimer, the term of this patent is extended or adjusted under 35 U.S.C. 154(b) by 0 days.

(21) Appl. No.: 15/717,586

(22) Filed: Sep. 27, 2017

(51) Int. Cl.
| | |
|---|---|
| H04N 19/00 | (2014.01) |
| H04N 1/41 | (2006.01) |
| H04N 1/64 | (2006.01) |
| G06F 17/24 | (2006.01) |
| G06T 1/20 | (2006.01) |
| G06T 11/60 | (2006.01) |
| G06T 11/20 | (2006.01) |

(52) U.S. Cl.
CPC .............. G06F 17/248 (2013.01); G06T 1/20 (2013.01); G06T 11/203 (2013.01); G06T 11/60 (2013.01)

(58) Field of Classification Search
CPC ................................ G06F 17/248; G06T 1/20
USPC .......................................................... 715/223
See application file for complete search history.

(56) References Cited

U.S. PATENT DOCUMENTS

| | | | |
|---|---|---|---|
| 5,748,174 A | 5/1998 | Wong et al. | |
| 5,761,524 A * | 6/1998 | Peterson | ............. G06F 9/30065 712/17 |
| 6,330,071 B1 | 12/2001 | Vidyanand | |
| 6,441,918 B1 | 8/2002 | Hori | |
| 6,919,967 B1 | 7/2005 | Pentecost et al. | |
| 6,985,249 B2 | 1/2006 | Klassen et al. | |
| 8,223,388 B2 | 7/2012 | Nakao et al. | |
| 8,416,249 B2 | 4/2013 | Ichieda | |
| 8,526,036 B2 | 9/2013 | Bellert et al. | |
| 8,527,563 B2 | 9/2013 | Brugiolo | |
| 8,767,009 B1 * | 7/2014 | Guy | ........................ G09G 5/363 345/620 |
| 9,336,555 B1 * | 5/2016 | Guy | .......................... G06T 1/20 |
| 2015/0062136 A1 * | 3/2015 | Yamauchi | .............. G09G 5/363 345/522 |
| 2015/0091892 A1 * | 4/2015 | Kwon | ................... G06T 15/005 345/419 |
| 2015/0161805 A1 * | 6/2015 | Glazer | .................... H04L 67/10 345/441 |
| 2016/0086062 A1 * | 3/2016 | Torii | .................. G06K 15/1813 358/1.13 |

(Continued)

OTHER PUBLICATIONS

PostScript Language Reference Manual, Second Edition, Adobe Systems Incorporated, Addison-Wesley Publishing Company, Inc., 774 pages.

(Continued)

*Primary Examiner* — Cesar B Paula
*Assistant Examiner* — Luu-Phuong T Nguyen
(74) *Attorney, Agent, or Firm* — Lewis Roca Rothgerber Christie LLP

(57) ABSTRACT

A method to detect reusable groups of drawing commands in a sequence of drawing commands. Drawing commands are identified by checksums. Recurring and co-occurring drawing commands are combined into groups of drawing commands. Under certain conditions such a group can be replaced by a new drawing command, making the group reusable.

23 Claims, 9 Drawing Sheets

(56) References Cited

U.S. PATENT DOCUMENTS

2016/0104264 A1\* 4/2016 Arulesan ............... G06T 15/005
 345/582
2016/0179445 A1 6/2016 Bozier

OTHER PUBLICATIONS

PostScript Language Reference, Third Edition, Adobe Systems Incorporated, Addison-Wesley Publishing Company, 912 pages.
Tim Bienz and Richard Cohn, Portable Document Format Reference Manual, Adobe Systems Incorporated, Addison-Wesley Publishing Company, 230 pages.
PDF Reference, 2nd Edition, Adobe Portable Document Format Version 1.3, Adobe Systems Incorporated, Addison-Wesley Publishing Company, 696 pages.
HP PCL/PJL Reference, PCL 5 Printer Language Technical Reference Manual, 762 pages.
IBM Data Stream and Object Architectures, Intelligent Printer Data Stream Reference, 7th Edition, Nov. 2002, 808 pages.
Advanced Function Presentation Consortium, Data Stream and Object Architectures, Intelligent Printer Data Stream Reference, Eleventh Edition (Jun. 2014), 1028 pages.

\* cited by examiner

| 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|
| $A_1$ | $V_1$ | $V_2$ | $V_3$ | $V_4$ | $V_5$ | $A_2$ | $B_1$ | $A_3$ | $A_4$ | $V_6$ | $B_2$ | $C_1$ | $C_2$ | $C_3$ | $A_5$ |

| 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|
| $A_1$ | $V_7$ | $V_8$ | $V_9$ | $V_{10}$ | $V_{11}$ | $A_2$ | $D_1$ | $A_3$ | $A_4$ | $V_{12}$ | $D_2$ | $C_1$ | $C_2$ | $C_3$ | $A_5$ |

| 33 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|
| $A_1$ | $V_{13}$ | $V_{14}$ | $V_{15}$ | $V_{16}$ | $V_{17}$ | $A_2$ | $B_1$ | $A_3$ | $A_4$ | $V_{18}$ | $B_2$ | $C_1$ | $C_2$ | $C_3$ | $A_5$ |

| 48 | 49 | 50 | 51 | 52 | 53 | 54 | 55 | 56 | 57 | 58 | 59 | 60 | 61 | 62 | 63 | 64 |
|---|---|---|---|---|---|---|---|---|---|---|---|---|---|---|---|---|
| $A_1$ | $V_{19}$ | $V_{20}$ | $V_{21}$ | $V_{22}$ | $V_{23}$ | $V_{24}$ | $A_2$ | $D_1$ | $A_3$ | $A_4$ | $V_{25}$ | $D_2$ | $C_1$ | $C_2$ | $C_3$ | $A_5$ |

FIG. 5

| Id. | Locations |
|---|---|
| $A_1$ | 01, 17, 33, 48 |
| $A_2$ | 07, 23, 38, 55 |
| $A_3$ | 09, 25, 40, 57 |
| $A_4$ | 10, 26, 41, 58 |
| $A_5$ | 16, 32, 47, 64 |
| $B_1$ | 08, 39 |
| $B_2$ | 12, 43 |
| $C_1$ | 13, 29, 44, 61 |
| $C_2$ | 14, 30, 45, 62 |
| $C_3$ | 15, 31, 46, 63 |
| $D_1$ | 24, 56 |
| $D_2$ | 28, 60 |

FIG. 6

| Id. | Interference |
|---|---|
| $A_4$ | $A_3$ |
| $A_5$ | $A_3$ |
| $B_2$ | $A_3$ |
| $C_1$ | $A_3$ |
| $C_2$ | $C_1, A_3$ |
| $C_3$ | $C_2, A_3$ |
| $D_2$ | $A_3$ |
| $V_6$ | $A_3$ |
| $V_{12}$ | $A_3$ |
| $V_{18}$ | $A_3$ |
| $V_{25}$ | $A_3$ |

FIG. 9

| Group content | Occurrence #1 | Occurrence #2 | Occurrence #3 | Occurrence #4 |
|---|---|---|---|---|
| $A_1$ | 01 | 17 | 33 | 48 |
| $A_1, A_2$ | 01, 07 | 17, 23 | 33, 38 | 48, 55 |
| $A_1, A_2, B_1$ | 01, 07, 08 | Fail: no $B_1$ | 33, 38, 39 | Fail: no $B_1$ |
| $A_1, A_2, A_3$ | 01, 07, 09 | 17, 23, 25 | 33, 38, 40 | 48, 55, 57 |
| $A_1, A_2, A_3, A_4$ | 01, 07, 09, 10 | 17, 23, 25, 26 | 33, 38, 40, 41 | 48, 55, 57, 58 |
| $A_1, A_2, A_3, A_4, B_2$ | 01, 07, 09, 10, 12 | Fail: no $B_2$ | 33, 38, 40, 41, 43 | Fail: no $B_2$ |
| $A_1, A_2, A_3, A_4, C_1$ | 01, 07, 09, 10, 13 | Fail: relative position of $C_1$ | 33, 38, 40, 41, 44 | Fail: relative position of $C_1$ |
| $A_1, A_2, A_3, A_4, C_2$ | 01, 07, 09, 10, 14 | Fail: relative position of $C_2$ | 33, 38, 40, 41, 45 | Fail: relative position of $C_2$ |
| $A_1, A_2, A_3, A_4, C_3$ | 01, 07, 09, 10, 15 | Fail: relative position of $C_3$ | 33, 38, 40, 41, 46 | Fail: relative position of $C_3$ |
| $A_1, A_2, A_3, A_4, A_5$ | 01, 07, 09, 10, 16 | 17, 23, 25, 26, 32 | 33, 38, 40, 41, 47 | 48, 55, 57, 58, 64 |

FIG. 10

| Group content | Occurrence #1 | Occurrence #2 |
|---|---|---|
| $B_1$ | 08 | 39 |
| $B_1, B_2$ | 08, 09 | 39, 40 |
| $B_1, B_2, C_1$ | 08, 09, 10 | Fail: relative position of $C_1$ |
| $B_1, B_2, C_2$ | 08, 09, 11 | Fail: relative position of $C_2$ |
| $B_1, B_2, C_3$ | 08, 09, 12 | Fail: relative position of $C_3$ |

FIG. 11

| Group content | Occurrence #1 | Occurrence #2 | Occurrence #3 | Occurrence #4 |
|---|---|---|---|---|
| $C_1$ | 13 | 29 | 44 | 61 |
| $C_1, C_2$ | 13, 14 | 29, 30 | 44, 45 | 61, 62 |
| $C_1, C_2, C_3$ | 13, 14, 15 | 29, 30, 31 | 44, 45, 46 | 61, 62, 63 |

FIG. 12

| Group content | Occurrence #1 | Occurrence #2 |
|---|---|---|
| $D_1$ | 24 | 56 |
| $D_1, D_2$ | 24, 28 | 56, 60 |

FIG. 13

| Id. | Location |
|---|---|
| 1 | 17 |
| 2 | 33 |
| 3 | 49 |
| 4 | 65 |

FIG. 14

SYSTEM AND METHOD FOR DETECTING REUSABLE GROUPS OF DRAWING COMMANDS IN A SEQUENCE OF DRAWING COMMANDS

FIELD

One or more embodiments according to the present invention relate to computer systems which perform drawing operations such as computer displays, video systems, printers, and raster image processors (RIPs).

BACKGROUND

In a computer system which performs drawing operations on an output device, such as a computer display, video system, printer, or raster image processor (RIP), drawings are, in general, created by drawing commands, such as commands to draw a line, to draw a path (sequence of lines), to fill a path, to draw an image, to draw text, to fill a path with a gradient and the like. The content to be drawn is often artwork created by a designer, and a drawing application outputs the artwork using drawing commands available on the output device. A set of drawing commands available for an output device can be called a Page Description Language (PDL).

Drawing commands are applied on a drawing area, e.g., screen of a computer display or page of a printer. The sequence of drawing commands is in general divided at certain points where the drawing area is displayed or viewed, after which the drawing area is cleared and new drawing commands are applied independently of the previous drawing commands. These points can be called observation points. Certain optimizations only consider the state of the drawing area at each observation point (completed display image or completed page) rather than the state of the drawing area after each individual drawing command.

Within a sequence of drawing commands, a group of drawing commands can be used to form a more complex graphical element, like a company logo. In certain applications such complex graphical elements may be output repeatedly within a sequence of drawing commands.

The resolution of output devices (e.g., dots per inch, dpi) is ever increasing. Also the complexity of drawings is ever increasing, e.g., by the output devices offering color management, transparency, shading and the like, and by designers making more complex artwork. In general this results in ever increasing requirements on CPU speed and memory size. Optimizations to the rendering of drawing commands can be applied in order to reduce such hardware requirements.

Various approaches have been taken to optimize drawing commands.

A related art method for optimizing drawing commands is to cache drawing commands that occur multiple times. The drawing commands or the rendered/rasterized output produced by executing drawing commands are written to cache memory of the output device. When the drawing command recurs, repeated transmission or execution is avoided by using the cached data. See e.g., U.S. Pat. No. 6,441,918 (Hori, Fuji Xerox, about font caching). This method requires that cache worthy drawing commands are identified and that an optimized form of the drawing commands is stored in a cache.

Selecting cache worthy drawing commands can be done by the type of the drawing commands. E.g., see U.S. Pat. No. 8,416,249 (Ichieda, Seiko Epson) which discloses caching all drawing commands for image data. A drawback of this approach is that it is very coarse. There is no indication if an image will be reused, and therefore some images will be cached uselessly.

Another approach for selecting cache worthy drawing commands, e.g., U.S. Pat. No. 6,985,249 (Klassen, Xerox) identifies drawing commands and additionally evaluates drawing frequency, distance to the next occurrence, and processing cost of each drawing command. A drawback of this approach is that it only considers individual drawing commands and does not recognize groups of drawing commands that appear frequently together, and thereby misses some potential optimizations.

US Publication No. 2016/0179445 A1 (Bozier, Canon), for example, selects cache worthy drawing commands by recognizing consecutive sequences of repeating drawing commands. However, this approach still fails to recognize repeating groups of non-consecutive drawing commands where each group can be replaced by a single drawing command which has the same appearance as the group as a whole. Therefore this method still misses some potential to optimize by combining drawing commands, e.g., where reusable drawing commands are interspersed with non-reusable drawing commands.

Other approaches for selecting cache worthy drawing commands require that the creator mark drawing commands as reusable. This approach is often used in variable data printing, where the drawing commands are generated from a template, enabling the creator to easily identify which drawing commands will appear multiple times. The output device then only caches the drawing commands marked as reusable. For example, in U.S. Pat. No. 8,526,036 (Bellert, Konica Minolta), reusable data are marked as such using Personalized Print Markup Language (PPML). A similar approach is used by U.S. Pat. No. 6,330,071 (Vidyanand, EFI) where a printer driver outputs master pages containing reused drawing commands separately from variable content. A drawback of this approach is that it depends on the information provided by the creator of the drawing commands.

One method to allow the creator to identify drawing commands as reusable is to allow for drawing commands that group multiple drawing commands together. Such combined commands are known in display systems as surfaces (U.S. Pat. No. 8,527,563, Brugiolo, Microsoft) or layers (U.S. Pat. No. 5,748,174, Wong, VTech Electronics). In various page description languages for printers (PDLs) a set of drawing commands may be grouped together and the group of drawing commands may then be referenced multiple times, e.g., by PCL macros (see PCL5 Printer Language Technical Reference Manual, Hewlett-Packard Corporation, 1992), PostScript Forms (see PostScript Language Reference 2nd edition, Adobe Systems Inc., 1990, PostScript Language Reference 3rd edition, Adobe Systems Inc., 1999), AFP Overlays (Intelligent Printer Data Stream Reference, Sixth Edition, IBM Corporation, 2002) or PDF form XObjects (Portable Document Format Reference Manual 1.0, Adobe Systems 1993; PDF Reference second edition, Adobe Portable Document Format, Version 1.3, Adobe Systems 2000). This approach is used, e.g., by U.S. Pat. No. 6,919,967 (Pentecost, HP) which uses PCL macros to identify static page aspects and to create static page objects. The main drawback of all these approaches is that they rely on information prepared by the creator of the drawing commands and that the creator of the drawing commands must be aware of the trade-off between the optimization benefits and the overhead introduced by marking drawing commands as reusable.

U.S. Pat. No. 8,223,388 (Nakao, Fujifilm) describes a method where content previously marked as reusable is recognized as occurring at different locations on the same page. In contrast, the present invention combines the recognition of content as static/reusable with the recognition as occurring at different locations on the same page.

SUMMARY

Embodiments of the present invention provide a method to optimize the rendering of drawing commands that are repeated within a sequence of drawing commands, without the creator of the drawing commands identifying such drawing commands explicitly.

Embodiments of the present invention may be implemented by a reuse analysis step that identifies which drawing commands are repeated sufficiently often to be a candidate for optimization and marks those as reused drawing commands, followed by an optional order analysis step that determines for each pair of reused drawing commands whether they may be re-ordered, followed by a group analysis step that identifies a group of drawing commands and its occurrences in the sequence of drawing commands, followed by an optimization step in which the sequence of drawing commands is modified by replacing the occurrences of the group with a new, combined drawing command. The group analysis and the optimization steps are repeated until no more new groups can be found.

The reuse analysis step, identifying repeated drawing commands, may be executed to either find drawing commands with the same appearance that always appear in the same location, representing static content, or to find drawing commands with the same appearance that may appear in different locations, representing reusable content. The difference lies in the set of parameters of the drawing commands that are taken into account when determining whether drawing commands have the same appearance. It should be noted that small changes in the size or position may be ignored if after rendering/rasterization the results of the drawing commands would be indistinguishable to the human eye.

The order analysis step, determining the possibility to re-order drawing commands, should take into account overlap between reused drawing commands (one drawing command drawing in the same area as a previous drawing command), as exchanging the drawing order of two drawing commands that overlap each other will affect the final appearance. This information is used in the group analysis step in order to determine whether reused drawing commands may be grouped together as the grouping may change the drawing order of commands after optimization.

The group analysis step identifies a group of reused drawing commands and its occurrences in the sequence of drawing commands. Each occurrence includes drawing commands that can be replaced together by a single drawing command. Further each occurrence contains one drawing command for each drawing command in the group where both drawing commands have the same checksum. Within each occurrence, the group analysis step should take into account the relative positions between the drawing commands, as the drawing commands in the occurrence will always be displayed together. It should be noted that this does not necessarily imply that each occurrence of the drawing commands in the group must occur in the same order in the sequence of drawing commands, or that they must appear as a sequence without intervening drawing commands that are not part of the group. However, the replacement of each occurrence of the group of drawing commands by a new drawing command should not alter the appearance of the sequence of drawing commands at the observations points in said sequence of drawing commands.

It should be noted that the purpose of a checksum, e.g. for a drawing command, is to provide a short representation of the item which can be easily compared and which is sufficiently unique, i.e. where two checksums are very unlikely to be equal when the original items are not equal. The checksum allows for a reduction of the number of comparisons to determine potentially equal items in a large set of items. Using checksums, only a small number of original items have to be compared.

It should be noted that different levels of tolerance can be established for what constitutes an alteration of the appearance of a sequence of drawing commands. For example, on a high resolution device, a 1 pixel shift of part of the output or of the whole output might not be visible to the human eye, and might therefore be considered as no change.

In embodiments of the present invention the creator of the drawing commands does not need to identify reused drawing commands and the creator does not need to be aware of when it is desirable to mark drawing commands as reusable for a given output device. A further feature of the current method is that it allows for reusable content to be identified instead of only static content. An additional aspect is that the method can be executed at high speed and that the reuse analysis and the order analysis steps may be limited to only a subset of the drawing commands without significantly impacting the effectiveness of the optimization as a whole.

In an embodiment of the present invention, the drawing commands may be in PDF format and after processing the reused drawing commands are identified as specified in the PDF/VT specification. It should be obvious to a person skilled in the art that the optimization method according to embodiments of the present invention may be equally applied to other page description languages, such as PostScript, PCL and AFP, that specify drawing commands and provide mechanisms for grouping drawing commands together and referencing such a group of drawing commands.

Similarly it should be obvious to a person skilled in the art that the optimization method according to embodiments of the present invention can also be used as a compression algorithm to reduce the size of the representation of a sequence of drawing commands. The method according to embodiments of the present invention may therefore be applied equally in the fields of image and/or video compression as well as remote display protocols.

According to an embodiment of the present invention, there is provided a method for detecting a group of drawing commands in a sequence of drawing commands including a set of observation points defining locations at which an appearance of drawing commands is evaluated, wherein said group of drawing commands occurs multiple times, and each occurrence of said group can be replaced within the sequence of drawing commands by a single drawing command to obtain a modified sequence of drawing commands from the original sequence of drawing commands such that, after replacement, the appearance of the original sequence of drawing commands at each observation point is the same as the appearance of the modified sequence of drawing commands at each observation point, the method including: determining reused drawing commands of the sequence of drawing commands where each reused drawing command is associated with a checksum; determining a sequence of checksums identifying a group of reused drawing commands and a set of occurrences identifying where the drawing commands of the group of reused drawing commands occur in the sequence of drawing commands, wherein each occurrence contains a set of locations of reused drawing commands with one drawing command associated with each of said checksums, wherein further, for each checksum in the sequence of checksums, the drawing commands associated with that checksum each draw at the same position relative to a reference point defined for the occurrence containing the respective drawing command, and wherein further the drawing commands contained in a given occurrence can be removed from the original sequence of drawing commands, reordered into the order determined by their associated checksums in the sequence of checksums, and re-inserted together as a group without changing the appearance at any observation point; and determining a replacement drawing command for the group of reused drawing commands associated with the sequence of checksums and replacing the group of reused drawing commands in each occurrence with an instance of the replacement drawing command such that after replacement the appearance at each observation point remains the same as before replacement.

Determining the sequence of checksums and determining the replacement drawing command may be repeated to determine and replace further groups of reused drawing commands.

Determining the reused drawing commands may include: determining the checksum for each drawing command in the sequence of drawing commands, taking into account appearance attributes specified by said drawing command; storing each said checksum in a map associating said checksum with a list of drawing commands having said checksum, each drawing command being identified by a reference to the drawing command within the sequence of drawing commands; and removing each checksum from the map when it is determined that the drawing command is not to be cached.

Determining the sequence of checksums may include: (a) scanning the sequence of drawing commands in the order in which they occur for a reused drawing command that has not been assigned to an occurrence and creating a sequence of checksums consisting initially of the checksum for that reused drawing command and a set of occurrences identifying all the reused drawing commands having the same checksum, with one drawing command per occurrence; (b) continuing scanning the sequence of drawing commands in order to locate an additional reused drawing command for which sufficient reused drawing commands can be found that each have the same checksum as the located additional reused drawing command and where at most one such additional reused drawing command occurs in each occurrence and each such additional reused drawing command draws in the same relative position with respect to a reference point defined for the occurrence in which it occurs; (c) validating that adding the checksum for those reused drawing commands to the sequence of checksums being determined and adding the reused drawing commands to the occurrences for that sequence of checksums adheres to the conditions for removing, re-ordering, and re-inserting drawing commands as specified before, and on successful validation updating the group and set of occurrences being determined appropriately; and (d) repeating (b) and (c) until the scanning process reaches an observation point.

For a system which allows defining containers and referencing such containers from a drawing command, determining the replacement drawing command may include: defining a container for the sequence of checksums whose content includes drawing commands with the same appearance as the drawing commands in each occurrence; and for the replacement, using a command which places the content of the container such that the appearance is the same as before the replacement.

The checksum may take into account the drawing position of the content drawn by the drawing command, such that only content drawn at the same position is identified as recurring.

The checksum may ignore the drawing position of the content drawn by the drawing command, such that content at different drawing positions is identified as recurring.

A preprocessing step may include: splitting compound drawing commands into basic drawing commands.

Changes to the appearance of a sequence of drawing commands may be determined by calculating and comparing a set of bounding boxes for each group of drawing commands.

The method may further include calculating an interference list which stores, for a given drawing command, the drawing commands which it overlaps, and using the interference list to determine that the relative drawing order between the drawing commands that overlap is maintained.

The original sequence of drawing commands may be derived from reading a Page Description Language (PDL).

The determination of appearance attributes of a drawing command may take into account the graphics state defined for that drawing command.

The original sequence of drawing commands may be provided by a document composition tool.

The original sequence of drawing commands may be provided by a raster image processor (RIP).

The modified sequence of drawing commands may be stored in a Page Description Language (PDL).

The modified sequence of drawing commands may be stored in a Page Description Language (PDL) and the replacement drawing commands may be implemented using forms or macros.

The modified sequence of drawing commands may be stored in Portable Document Format (PDF) using optional content, allowing drawing commands to be selectively enabled or disabled for raster image processor (RIP) optimization purposes.

The modified sequence of drawing commands may be directly interpreted by a raster image processor (RIP) to generate raster data for each observation point.

The modified sequence of drawing commands may refer to pre-rasterized data.

After performing the above method, the method may be applied again to the resulting modified sequence of drawing commands, resulting in a further optimized version of the sequence of drawing commands.

BRIEF DESCRIPTION OF THE DRAWINGS

These and other features and aspects of the present invention will be appreciated and understood with reference to the specification, claims, and appended drawings wherein:

FIG. 5 shows the sequence of checksums for the drawing commands for FIGS. 1-4 together with their locations according to an embodiment of the present invention.

FIG. 6 shows the mapping of checksums to locations according to an embodiment of the present invention.

FIG. 9 shows the overlap between drawing commands, called the interference list, according to an embodiment of the present invention.

FIGS. 10-13 show the calculation steps involved in the detection of groups A through D according to an embodiment of the present invention.

FIG. 14 shows the set of observation points that are used to limit the group construction according to an embodiment of the present invention.

DETAILED DESCRIPTION

The detailed description set forth below in connection with the appended drawings is intended as a description of exemplary embodiments provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. Further, one of ordinary skill in the art would appreciate that features of one or more embodiments according to the present invention may be combined in a suitable manner to practice other embodiments of the present invention. As denoted elsewhere herein, like element numbers are intended to indicate like elements or features.

It will be understood that, as used herein, the terms "optimize", "optimization", "optimizing", and "optimized" may describe various improvements and do not necessarily denote the result being in an optimal or optimum condition.

Figure 1:
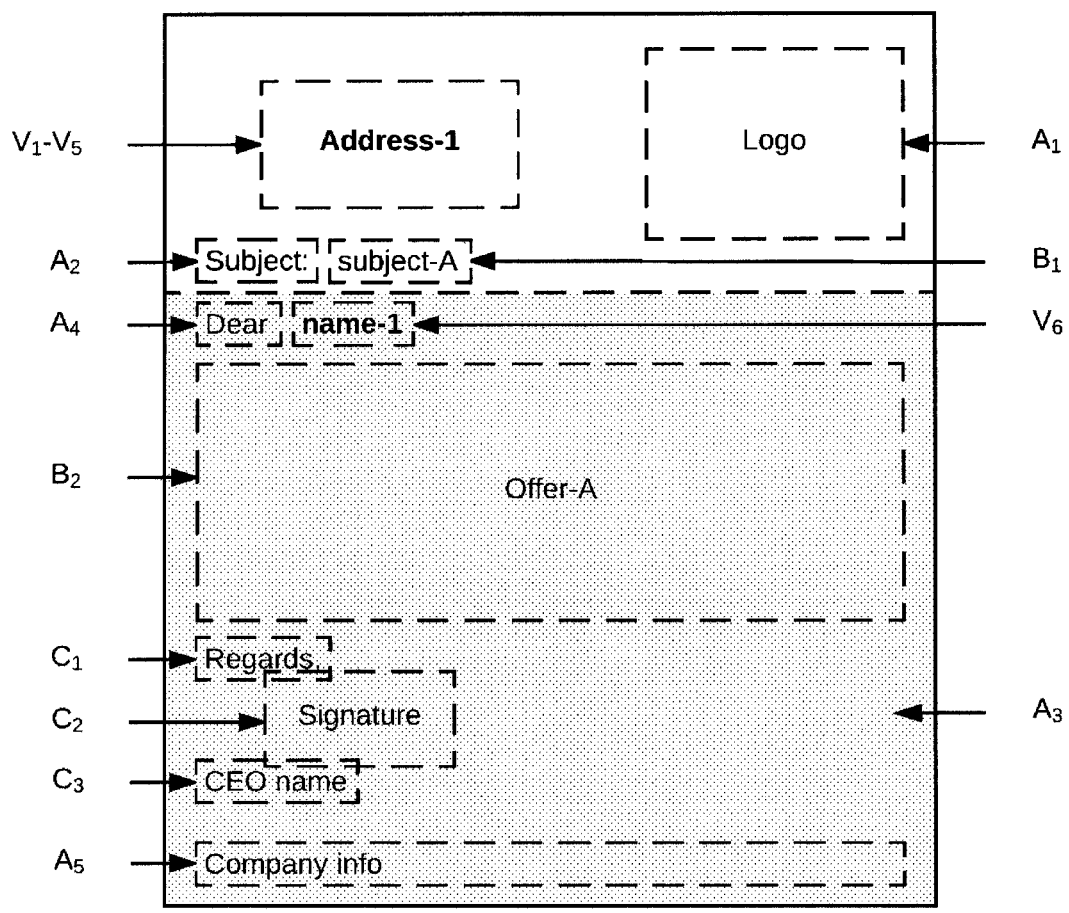
FIGS. 1-4 each depict a sample letter sent to different recipients in variants A and B. All four letters are pages of a sample PDF file according to an embodiment of the present invention.
Figure 2:
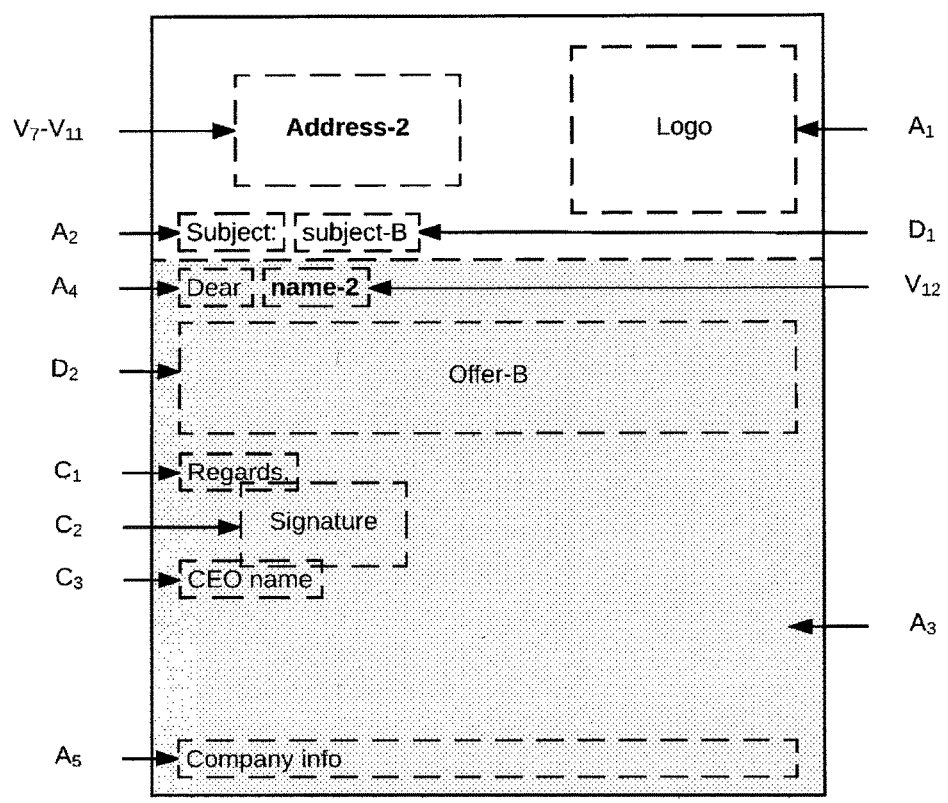
Figure 3:
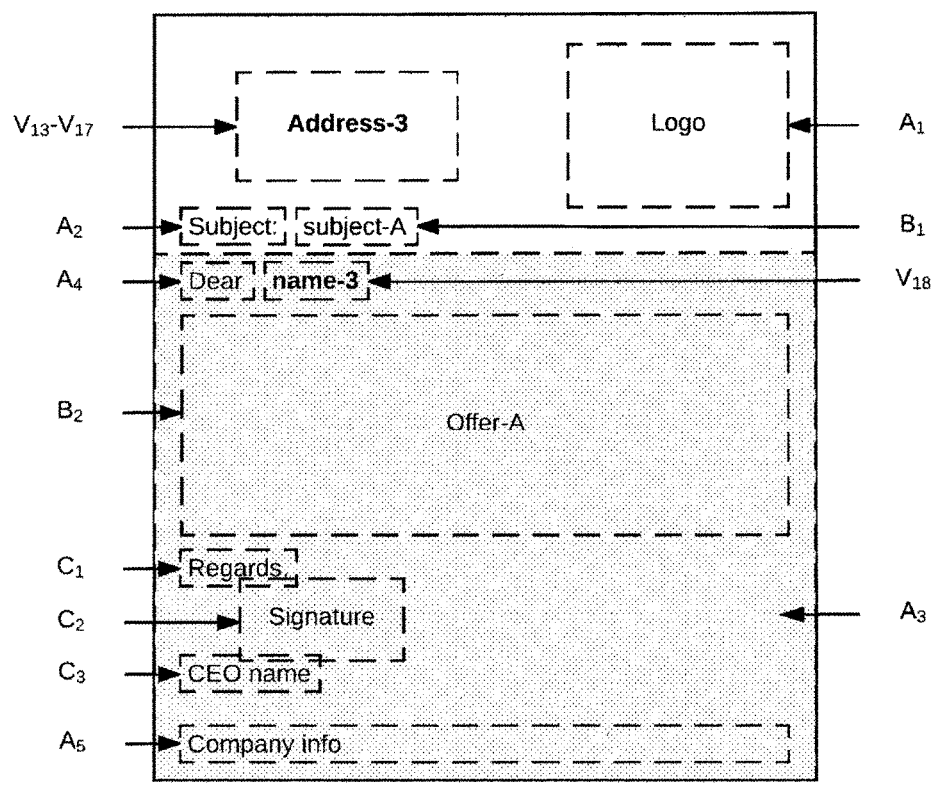
Figure 4:
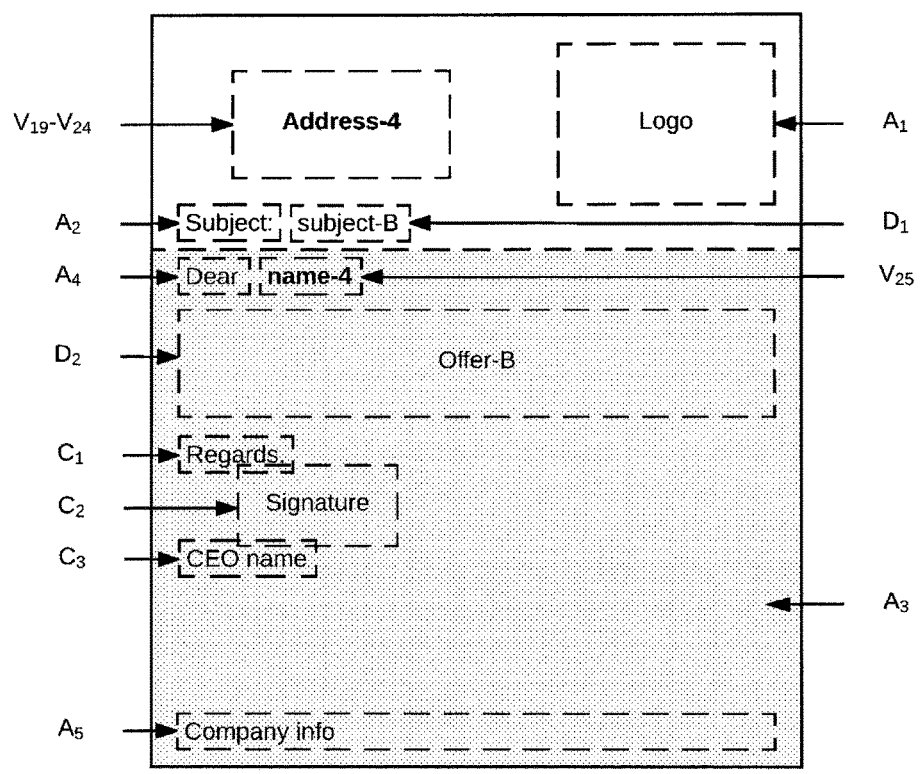

According to an embodiment of the present invention the sequence of drawing commands is derived from reading a PDF file. FIG. 1 and FIG. 3 each depict a sample letter sent to different recipients in variant A. FIG. 2 and FIG. 4 each depict a sample letter sent to different recipients in variant B. All four letters are pages of a sample PDF file used to illustrate a method according to an embodiment of the present invention.

The PDF specification includes many commands, some of which are used to set graphic state parameters (such as line width, line join, font, stroke color, fill color, clip path, current transformation matrix, etc.), some are used to define paths (such as moveto, lineto, curveto, etc.), and some other commands are used to produce the output marks (such as stroke, fill, show, etc.).

For the purpose of describing embodiments of the present invention, the drawing commands are defined by the commands that produce the output marks. The parameters of these drawing commands include the set of graphics state parameters that are in effect for said commands and thereby determine their appearance. Essentially the following basic commands are used in PDF: draw path, draw text, draw image and draw form. Each of the drawing commands includes graphic state parameters such as the current transformation matrix (determining size, rotation and location), the current color to draw with, the current clip path, the current line width, etc. A form can be defined to include a group of reusable drawing commands that may be placed as a whole onto a page using the draw form command.

In FIGS. 1-4, the items marked $A_1$ represent a company logo constructed from vector graphics, the items marked $C_2$ represent an image of a signature, the items marked $A_3$ represent a gradient filled rectangle used as a background and the remaining items represent text. Each item on the page is marked with dashed lines to show the smallest rectangular extent of the page, called the bounding box, which is (potentially) marked by the drawing command for that item.

Some drawing commands can be decomposed, e.g., a draw path command that draws multiple segments in a single command may be replaced by multiple draw path commands that each draw a single segment. Similarly a draw text command that draws multiple characters or words in a single command may be replaced by draw text commands each drawing an individual character, word or part of a word. In an embodiment of the present invention, such commands are decomposed for the purpose of analysis but only actually modified if during the output phase the decomposed commands are assigned to different groups. It should be noted that decomposition can cause more re-use to be found than is actually useful, e.g., splitting text commands down to the character level would find re-use for each letter but may increase the amount of analysis work without any significant benefits as drawing individual characters may already be optimized using a font cache.

According to an embodiment of the present invention, each page of a PDF file is read in sequence and the PDF content for each page is analyzed to determine the sequence of drawing commands for each page. The drawing commands from each page are concatenated to form a sequence of drawing commands with observation points located after the last drawing command of each page. The observation points indicate to the algorithm at which locations the appearance of the drawing commands before and after optimization should remain the same. Each drawing command is also assigned a sequence number representing the original order in which the drawing commands appear in the PDF file.

The examples in FIGS. 1-4 draw the items based on the upper left corner of the bounding box of each item in a top to bottom, left to right fashion. For FIG. 1 this drawing order would be $A_1$ $V_1$ $V_2$ $V_3$ $V_4$ $V_5$ $A_2$ $B_1$ $A_3$ $A_4$ $V_6$ $B_2$ $C_1$ $C_2$ $C_3$ $A_5$ and for FIG. 2 this drawing order would be $A_1$ $V_7$ $V_8$ $V_9$ $V_{10}$ $V_{11}$ $A_2$ $D_1$ $A_3$ $A_4$ $V_{12}$ $D_2$ $C_1$ $C_2$ $C_3$ $A_5$. It should be noted that the items marked $A_4$, $V_6$, $V_{12}$, $B_2$, $D_2$, $C_1$, $C_2$, $C_3$, and $A_5$ overlap (draw on top of) the item marked $A_3$.

Items marked $V_1$ through $V_{25}$ depict objects that are specific to a given recipient, such as their names and addresses, and are called variable items. Items marked $A_1$ through $A_5$ represent items that are present on each page and are called static items. Items marked $B_1$ and $B_2$ are items that are present for recipients receiving the A variant of the letter. Items marked $D_1$ and $D_2$ are items that are present for recipients receiving the B variant of the letter. Items marked $C_1$ through $C_3$ are items that are present on each page but whose location varies depending on the variant of the letter and are called reusable items.

Each of the aforementioned items is named after the group that will be created for them and is given an index which represents the order in which the item will be drawn within the group it belongs to, e.g., items $A_1$ through $A_5$ belong to the group of drawing commands named A in which item $A_1$ will be the first to be drawn and item $A_5$ will be the last to be drawn. A non-indexed item name is used to reference the group of drawing commands, e.g., A is shorthand for the sequence of drawing commands $A_1$ $A_2$ $A_3$ $A_4$ $A_5$.

The sequence of checksums for the drawing commands shown in the examples of FIGS. 1-4 is shown with their locations in FIG. 5. The indexed letters represent the different checksums. Static/reusable items ($A_x$, $B_x$, $C_x$, $D_x$) are shown in bold. Variable items ($V_x$) are shown in italic. The mapping of checksums to the locations where they appear is listed in FIG. 6.

Embodiments of the present invention include the following steps: a reuse analysis step, an optional order analysis step, a group analysis step, and an optimization step.

The reuse analysis step of the method determines the reused drawing commands. The reuse analysis step calculates a hash of each drawing command with all the relevant parameters that affect the appearance of that drawing command. A data structure (hash table) mapping hash values to drawing commands with that hash value is maintained, e.g. using an index of the respective drawing command. After hashing each drawing command in the sequence of drawing commands, the data structure can be examined to identify those drawing commands that are repeated sufficiently often to warrant caching, e.g. by checking if the number of drawing commands having this checksum is above a threshold, and to mark those as being reused drawing commands.

Throughout the figures, the aforementioned item names are used to identify items that have the same checksum. Therefore, all the items marked $A_1$ have the same checksum. All the items marked $C_2$ have the same checksum, even though the locations of the items vary. However, all the items marked $C_2$ have a different checksum from all the items marked $A_1$. Similarly, items marked $V_1$ through $V_{25}$ each have different checksums.

Figure 7:
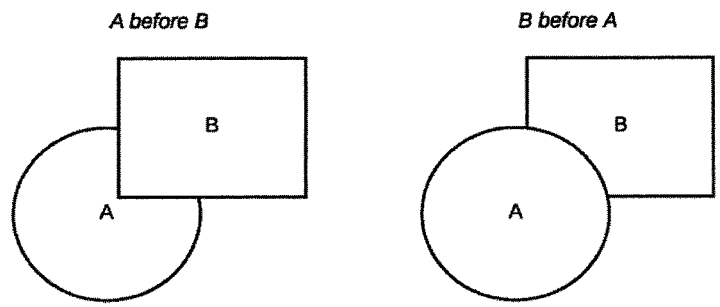
FIG. 7 illustrates the effect of drawing order for overlapping objects according to an embodiment of the present invention.

The order analysis step of the method is to determine overlap between drawing commands. The importance of overlap detection is illustrated in FIG. 7, which shows that the drawing order between two drawing commands that (partially) overlap is important because changing the drawing order produces different end results.

Figure 8:
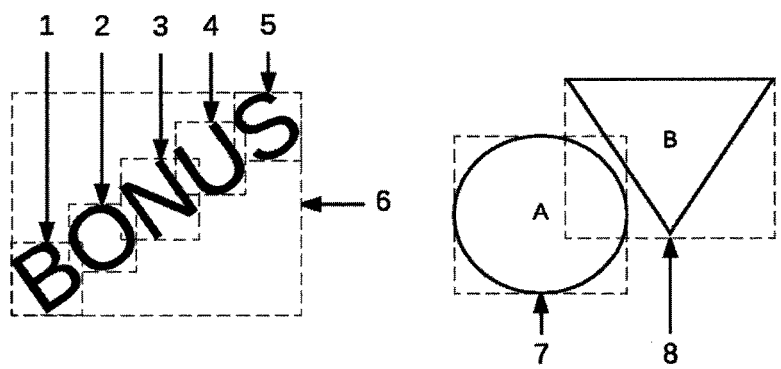
FIG. 8 illustrates that the area covered by the bounding boxes for individual characters can be significantly smaller than the bounding box for a whole word according to an embodiment of the present invention.

A commonly used method to approximate the areas drawn upon by drawing commands is using bounding boxes as illustrated in FIG. 8. The so-called bounding box of a drawing command is the smallest non-rotated rectangular area of the page that encompasses all the parts of the page that may be marked by that drawing command. In FIGS. 1-4 and FIG. 8 such areas are marked with dashed lines.

The order analysis step of the method constructs a data structure called the interference list that keeps track of which drawing commands overlap based on their bounding boxes. The interference list shown in FIG. 9 shows the overlap between the drawing commands for the example sequence of drawing commands shown in FIG. 5. It should be noted that checksums that have no overlap have been omitted from the interference list.

The interference list is consulted during the group analysis step of the method in order to ensure that the relative drawing order between overlapping drawing commands will remain the same after optimization. It should be noted that the creation of the interference list is not technically necessary as overlap calculation could be performed on the fly when necessary during the group analysis step. The interference list could also be constructed on the fly during the group analysis step by caching the results of overlap detection. However in some embodiments the interference list is created and stored as a separate step for optimization as it is known ahead of time for which drawing commands overlap should be determined.

According to an embodiment of the present invention the construction of the interference list is performed by processing each drawing command in the order in which it appears in the sequence of drawing commands whilst maintaining a data structure that maps a page area to a drawing command that draws in that area. The page area drawn upon by the current drawing command is determined and compared against the page areas for drawing commands appearing on the same page before the given drawing command. For each overlap that is detected, the list of drawing commands that the current drawing command overlaps is updated. The page area(s) drawn upon by the current drawing command is then added to the data structure that maps page areas to drawing commands.

Ideally, the interference list would be built from the exact, possibly arbitrarily shaped area(s) of the page that a drawing command draws upon. However, determining the exact area(s) drawn upon and determining whether arbitrary shaped areas overlap can be computationally expensive. In order to reduce the computational cost of building the interference list, approximations of the areas(s) of the page that a drawing command draws upon may be used.

The example in FIG. 8 illustrates that the area covered by bounding boxes marked 1 through 5 for the individual characters is significantly smaller than the bounding box marked 6 for the whole word. The bounding boxes marked 1 through 5, as well as 7 and 8 also illustrate how bounding boxes can lead to false positives when they are used to determine overlap between drawing commands. A so-called "false positive" occurs where an overlap between drawing commands is detected based on bounding boxes while the areas drawn upon by the drawing commands do not in fact overlap.

The group analysis step of the method determines a group of reused drawing commands that occur sufficiently often to warrant caching. For the purpose of group construction a data structure is maintained that tracks, for each drawing command, which group the drawing command has been assigned to and that tracks, for each group, the drawing commands assigned to the group. For the analysis, the group is represented by a sequence of checksums for the drawing commands in the group. Reused drawing commands identified in the reuse analysis step are all initially marked as unassigned whilst the remaining drawing commands, that are not marked as re-used, are all directly assigned to a variable data group.

The group analysis step then proceeds with analyzing each drawing command in the sequence of drawing commands in the order in which they appear in the sequence, searching for a reused drawing command that is not already assigned to a group. Once such a reused drawing command has been found a new group is constructed consisting initially of said drawing command by assigning the checksum of that drawing command to that group. For each instance of that drawing command one occurrence of the group is constructed.

The group analysis step then starts searching for drawing commands that may be assigned to that group as well. For this purpose the analysis process continues searching for another reused drawing command that is not already assigned to a group and which is therefore a candidate for being added into the group. The intervening drawing commands, which are the drawing commands not belonging to the group that occur between the first drawing command in the group and the drawing command that is a candidate to be added to the group, should be examined as described below as their drawing order may change after optimization.

Group construction should track both the set of intervening drawing commands, which after optimization will be drawn before the content of the group as well as the intervening drawing commands, which after optimization will be drawn after the content of the group. The intervening drawing commands that will be drawn before the content of the group should therefore not overlap any drawing command in the group and the intervening drawing commands that will be drawn after the content of the group should not be overlapped by any drawing command in the group. In both cases the interference list can be consulted to ensure that the drawing commands in the group adhere to the prescribed rules and prevent groups from being constructed that violate the prescribed rules.

The above prescribed rules can be illustrated based on the order of drawing commands before and after optimization for the example shown in FIG. 1. The initial drawing order for that example would be $A_1 \, V_1 \, V_2 \, V_3 \, V_4 \, V_5 \, A_2 \, B_1 \, A_3 \, A_4 \, V_6 \, B_2 \, C_1 \, C_2 \, C_3 \, A_5$ and after optimization this could become $A \, V_1 \, V_2 \, V_3 \, V_4 \, V_5 \, B \, V_6 \, C$. In this example, $A_3$ may not overlap $V_1$ through $V_5$ as after optimization $V_1$ through $V_5$ are drawn after A, which includes drawing $A_3$. Similarly, $A_3$ may not overlap $B_1$ and $B_2$ as after optimization $A_3$ will be drawn before B, which includes drawing $B_1$ and $B_2$. However, $C_1$ through $C_3$ may overlap $A_3$ as C, which includes drawing $C_1$ through $C_3$, will be drawn after A, which includes drawing $A_3$. These conditions can be seen to hold in the interference list shown in FIG. 9.

Other occurrences of the group of drawing commands should also be examined to verify that occurrences of the candidate drawing command exist that may be added to the other occurrences of the group of drawing commands. It should be noted that it is only necessary that sufficient occurrences can be found of the group of drawing commands to warrant caching, which implies that adding a candidate drawing command may reduce the number of occurrences of the group of drawing commands that is being constructed. If the number of occurrences is reduced a decision is made whether it is more efficient to extend the group of drawing commands to include the candidate drawing command or to create a new group with the candidate drawing command. Such a decision could for instance be based on the estimated savings achieved by the replacement of each group by its replacement drawing command. It should also be noted that for each occurrence of the group of drawing commands the properties of the occurrence regarding intervening drawing commands should be independently verified as the number and order of intervening drawing commands may be different for each occurrence of the group of drawing commands.

For each occurrence of a group of drawing commands the relative positions between the drawing commands within the occurrence should be identical, as after optimization each occurrence will be drawn with the same sequence of drawing commands. This property can be verified by calculating the overall bounding box of the drawing commands in a given occurrence and using, e.g., the lower left corner of that bounding box as a reference point for the relative position of each drawing command in the occurrence. If the relative position of a drawing command in the group is the same for each occurrence then the relative positioning between drawing commands is satisfied even if the drawing order between drawing commands varies for each occurrence.

The examples in FIGS. 1-4 illustrate that the relative positions between drawing commands in each occurrence are the same with respect to a reference point of each drawing command, e.g., the lower left corner of the bounding box of the drawing command. FIG. 1 and FIG. 2 further show that the position differences between $C_1$ and $C_2$ and between $C_2$ and $C_3$ are the same even though their absolute positions differ.

The process of scanning and adding checksums of reused drawing commands into the group and tracking occurrences continues until an observation point is encountered, which terminates the construction of said group. The drawing commands that are part of the other occurrences of the group are then also assigned to the group. The group analysis step then returns to scanning to find the first reused drawing command that is not assigned to a group. The group analysis step is completed once checksums of all reused drawing commands have been assigned to groups.

The calculation steps for the example sequence of drawing commands depicted in FIG. 5 that are performed during the detection of group A are shown in FIG. 10, for group B are shown in FIG. 11, for group C are shown in FIG. 12 and for group D are shown in FIG. 13. For each figure, the first column shows the checksums of the drawing commands in the group, and the remaining columns show the locations of the drawing commands in each occurrence being considered for the group. The set of observation points that are used to limit the group construction is shown in FIG. 14.

Figure 15:
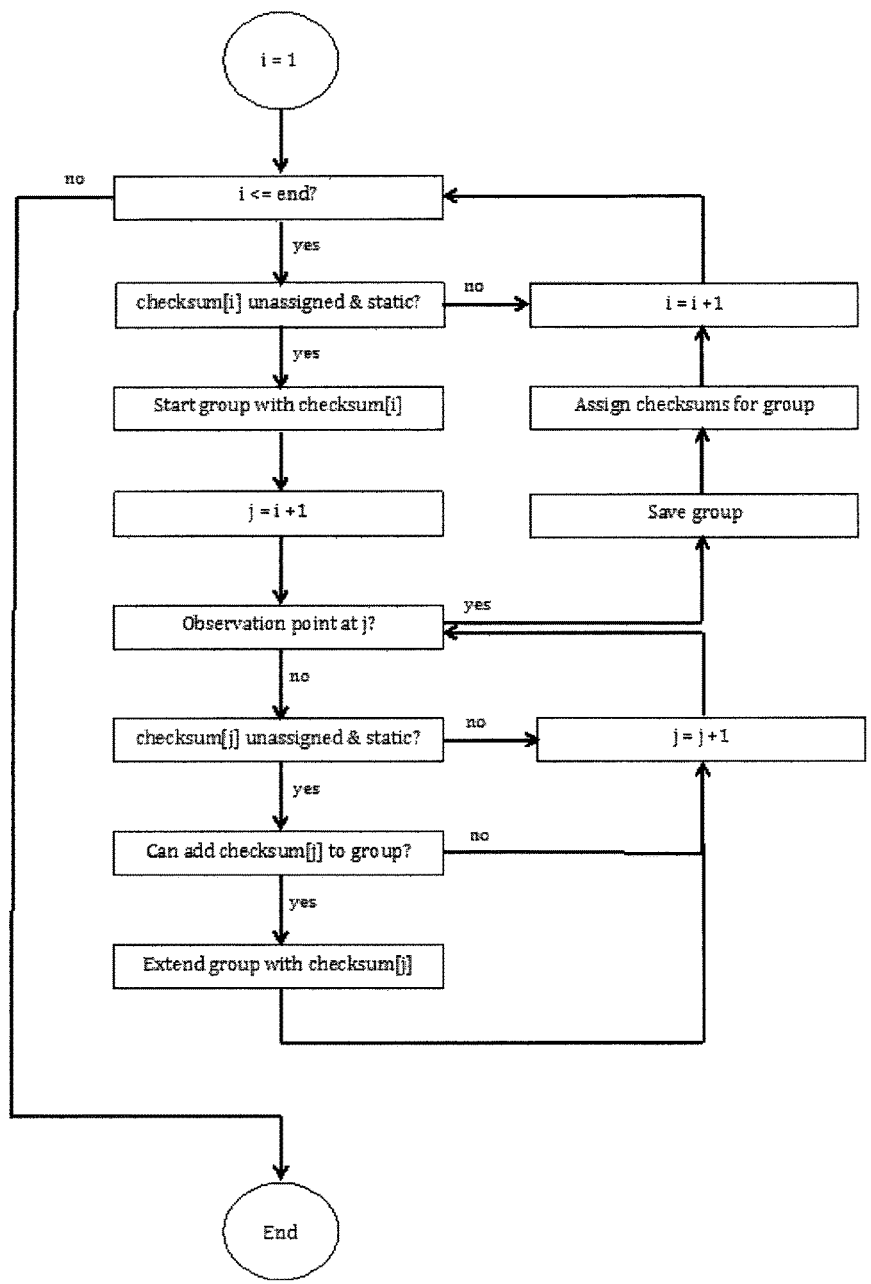
FIG. 15 shows pseudo code for the group detection algorithm used in an embodiment of the present invention.

The flowchart in FIG. 15 shows pseudo code for the group detection algorithm described above as it is used in an embodiment of the present invention.

The optimization step of the method defines a new replacement drawing command for each group of drawing commands found in the group analysis step and processes the sequence of drawing commands to replace the occurrences of each group by the newly created drawing commands whose content includes said group of drawing commands. For each occurrence the replacement drawing command is inserted at the position of the drawing command in that occurrence which has the smallest sequence number.

According to an embodiment of the present invention, the optimization step creates a PDF form XObject (compound drawing command) for each group of drawing commands. The content stream of the form is constructed from the drawing commands that make up the group. The content of the form XObject can be created from the drawing commands in any occurrence of the group of drawing commands, e.g. the first or the last occurrence. Each occurrence of the group is then replaced with a Do operator that references the form XObject defined for that group, with an appropriate graphics state to position the form in the correct location for that occurrence, for example by drawing the content of the container after applying a transformation matrix which compensates for the difference between the drawing positions of the drawing commands in the container and the drawing positions of the drawing commands in the respective occurrence. Each form XObject is then marked according to the PDF/VT specification as being reusable. The output PDF file is further modified to adhere to the PDF/VT specification.

A person skilled in the art will understand that the algorithms and data structures described in conjunction with embodiments of the present invention are only exemplary and that other data structures and algorithms may be used to achieve essentially the same results with different trade-offs between memory use, processing time and the detected groups of drawing commands. For example, while steps may be shown in a particular order, the present invention is not limited thereto, for instance, the order of steps may be changed, steps may be interleaved, steps may be performed sequentially, steps may be repeated individually, and/or a combination of steps may be repeated.

A relevant device or component (or relevant devices or components) according to embodiments of the present invention described herein may be implemented utilizing any suitable hardware (e.g., an application-specific integrated circuit), firmware (e.g., used by a digital signal processor (DSP) or field programmable gate array (FPGA)), software, or a suitable combination of software, firmware, and hardware. For example, the various components of the relevant device(s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors and/or in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

The terminology used herein is for the purpose of describing particular embodiments and is not intended to be limiting the present invention. As used herein, the singular forms "a" and "an" are intended to include the plural forms as well, unless the context clearly indicates otherwise. It will be further understood that the terms "comprise", "comprises", "comprising", "includes", "including", and "include", when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

As used herein, the terms "use", "using", and "used" may be considered synonymous with the terms "utilize", "utilizing", and "utilized", respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A method for detecting a group of drawing commands in an original sequence of drawing commands comprising a set of observation points defining locations at which an appearance of drawing commands is evaluated, wherein said group of drawing commands occurs multiple times in the original sequence of drawing commands, wherein the drawing commands in zero or more of the occurrences of said group are in a different order, wherein the drawing commands in zero or more of the occurrences of said group have intervening drawing commands not belonging to the occurrence, and wherein the method ensures that the sequence of drawing commands is reorderable such that, after reordering, the drawing commands of each occurrence of the group of repeated drawing commands have the same order and have no intervening drawing commands and the appearance of the reordered sequence of drawing commands at each observation point is the same as the appearance of the original sequence of drawing commands at the corresponding observation point, the method comprising:

computing, via a processor, for each drawing command in the original sequence of drawing commands, a checksum based on the drawing command and one or more appearance attributes associated with the drawing command;

determining, via the processor, reused drawing commands in the original sequence of drawing commands by identifying drawing commands having the same checksum; and determining, via the processor, a sequence of such checksums identifying a group of reused drawing commands and a set of occurrences identifying where the drawing commands of the group of reused drawing commands occur in the original sequence of drawing commands, wherein each occurrence contains a set of locations of reused drawing commands with one drawing command associated with each of said checksums, wherein further for each checksum in the original sequence of checksums, the drawing commands associated with that checksum each draw at the same position relative to a reference point defined for the occurrence containing the respective drawing command, and wherein further the drawing commands of the group are reorderable such that, after reordering, the drawing commands contained in each occurrence of the group of repeated drawing commands have the same order and have no intervening drawing commands, and the appearance at each observation point of the reordered sequence is the same as the appearance at the corresponding observation point of the original sequence.

2. The method according to claim 1, wherein the determining the sequence of checksums identifying the group of reused drawing commands and the determining the occurrences of the group are repeated to determine further groups and occurrences of reused drawing commands.

3. The method according to claim 2, wherein the original sequence of drawing commands is reordered and wherein each reordered occurrence of a group of reused drawing commands is replaced by a replacement drawing command with the same drawing effect as the group of reused drawing commands it replaces thereby providing a modified sequence of drawing commands.

4. The method according to claim 3, wherein the modified sequence of drawing commands is stored in a Page Description Language (PDL).

5. The method according to claim 3, wherein the modified sequence of drawing commands is stored in a Page Description Language (PDL) and the replacement drawing commands are implemented using forms or macros.

6. The method according to claim 3, wherein the modified sequence of drawing commands is stored in Portable Document Format (PDF) using optional content, allowing drawing commands to be selectively enabled or disabled for raster image processor (RIP) optimization purposes.

7. The method according to claim 3, wherein the modified sequence of drawing commands is directly interpreted by a raster image processor (RIP) to generate raster data for each observation point.

8. The method according to claim 3, wherein the modified sequence of drawing commands refers to pre-rasterized data.

9. The method according to claim 3, wherein after performing the method of claim 3, the method of claim 3 is applied again to the resulting modified sequence of drawing commands, resulting in a further optimized version of the sequence of drawing commands.

10. The method according to claim 1, wherein determining the reused drawing commands comprises:

computing, via the processor, the checksum for each drawing command in the sequence of drawing commands, taking into account appearance attributes specified by said drawing command;

storing, via the processor, each said checksum in a map associating said checksum with a list of drawing commands having said checksum, each drawing command being identified by a reference to the drawing command within the sequence of drawing commands; and removing, via the processor, each checksum from the map when it is determined that the drawing command is not to be cached.

11. The method according to claim 10, wherein the determination of appearance attributes of a drawing command takes into account the graphics state defined for that drawing command.

12. The method according to claim 1, wherein determining a sequence of checksums comprises:

(a) scanning, via the processor, the sequence of drawing commands in the order in which they occur for a reused drawing command that has not been assigned to an occurrence and creating a sequence of checksums consisting initially of the checksum for that reused drawing command and a set of occurrences identifying all the reused drawing commands having the same checksum, with one drawing command per occurrence;

(b) continuing scanning, via the processor, the sequence of drawing commands in order to locate an additional reused drawing command for which sufficient reused drawing commands can be found that each have the same checksum as the located additional reused drawing command and where at most one such additional reused drawing command occurs in each occurrence and each such additional reused drawing command draws in the same relative position with respect to a reference point defined for the occurrence in which it occurs;

(c) validating, via the processor, that adding the checksum for those reused drawing commands to the sequence of checksums being determined and adding the reused drawing commands to the occurrences for that sequence of checksums adheres to the conditions for re-ordering drawing commands as specified in claim 1, and on successful validation updating the group and the set of occurrences being determined appropriately; and (d) repeating (b) and (c) until the scanning process reaches an observation point.

13. The method according to claim 1, wherein the checksum takes into account the drawing position of the content drawn by the drawing command, such that only content drawn at the same position is identified as recurring.

14. The method according to claim 1, wherein the checksum ignores the drawing position of the content drawn by the drawing command, such that content at different drawing positions is identified as recurring.

15. The method according to claim 1, wherein changes to the appearance of a sequence of drawing commands are determined by calculating and comparing a set of bounding boxes for each group of drawing commands.

16. The method according to claim 1, wherein the method further comprises calculating an interference list which stores, for a given drawing command, the drawing commands which it overlaps, and using the interference list to determine that the relative drawing order between the drawing commands that overlap is maintained.

17. The method according to claim 1, wherein the original sequence of drawing commands is derived from reading a Page Description Language (PDL).

18. The method according to claim 1, wherein the original sequence of drawing commands is provided by a document composition tool.

19. The method according to claim 1, wherein the original sequence of drawing commands is provided by a raster image processor (RIP).

20. The method according to claim 1, wherein the original sequence of drawing commands is reordered and wherein each reordered occurrence of a group of reused drawing commands is replaced by a replacement drawing command with the same drawing effect as the group of reused drawing commands it replaces thereby providing a modified sequence of drawing commands.

21. The method according to claim 20, wherein, for a system which allows defining containers and referencing such containers from a drawing command, determining the replacement drawing command comprises:

defining, via the processor, a container for the sequence of checksums whose content comprises drawing commands with the same appearance as the drawing commands in each occurrence; and for the replacement, using a command which places the content of the container such that the appearance is the same as before the replacement.

22. A method comprising:

splitting, via a processor, compound drawing commands into basic drawing commands; and applying, via the processor, the method of claim 1 to the basic drawing commands.

23. A system for detecting a group of drawing commands in an original sequence of drawing commands comprising a set of observation points defining locations at which an appearance of drawing commands is evaluated, wherein said group of drawing commands occurs multiple times in the original sequence of drawing commands, wherein the drawing commands in zero or more of the occurrences of said group are in a different order, wherein the drawing commands in zero or more of the occurrences of said group have intervening drawing commands not belonging to the occurrence, and wherein the system ensures that the sequence of drawing commands is reorderable such that, after reordering, the drawing commands of each occurrence of the group of repeated drawing commands have the same order and have no intervening drawing commands and the appearance of the reordered sequence of drawing commands at each observation point is the same as the appearance of the original sequence of drawing commands at the corresponding observation point, the system comprising:

a processor; and memory, wherein the memory stores instructions that, when executed by the processor, cause the processor to:

compute, for each drawing command in the original sequence of drawing commands, a checksum based on the drawing command and one or more appearance attributes associated with the drawing command;

determine reused drawing commands in the original sequence of drawing commands by identifying drawing commands having the same checksum; and determine a sequence of such checksums identifying a group of reused drawing commands and a set of occurrences identifying where the drawing commands of the group of reused drawing commands occur in the original sequence of drawing commands, wherein each occurrence contains a set of locations of reused drawing commands with one drawing command associated with each of said checksums, wherein further for each checksum in the original sequence of checksums, the drawing commands associated with that checksum each draw at the same position relative to a reference point defined for the occurrence containing the respective drawing command, and wherein further the drawing commands of the group are reorderable such that, after reordering, the drawing commands contained in each occurrence of the group of repeated drawing commands have the same order and have no intervening drawing commands, and the appearance at each observation point of the reordered sequence is the same as the appearance at the corresponding observation point of the original sequence.

* * * * *